United States Patent [19]

Kusaka

[11] Patent Number: 5,666,567
[45] Date of Patent: Sep. 9, 1997

[54] IMAGE SENSOR WITH ACCUMULATION TIME OF ELECTRIC CHARGES DETERMINED BY SUBJECT IMAGE SIGNALS

[75] Inventor: Yosuke Kusaka, Kanagawa-ken, Japan

[73] Assignee: Nikon Corporation, Tokyo, Japan

[21] Appl. No.: 262,260

[22] Filed: Jun. 20, 1994

[30] Foreign Application Priority Data

Jun. 18, 1993 [JP] Japan .................... 5-147195

[51] Int. Cl.$^6$ .............................. G03B 3/00; G03B 13/18
[52] U.S. Cl. ............................ 396/96; 396/127; 348/356
[58] Field of Search .................................. 354/407, 408;
348/349, 356; 396/89, 96, 111, 113, 114, 125, 126, 127, 128

[56] References Cited

U.S. PATENT DOCUMENTS

| | | | |
|---|---|---|---|
| 4,180,309 | 12/1979 | Miyata et al. ............................ | 354/25 |
| 4,305,657 | 12/1981 | Masunaga et al. . | |
| 4,329,577 | 5/1982 | Asano et al. . | |
| 4,377,742 | 3/1983 | Kawabata et al. . | |
| 4,443,079 | 4/1984 | Oinoue et al. ............................ | 354/407 |
| 4,638,364 | 1/1987 | Hiramatsu ................................ | 358/227 |
| 4,660,955 | 4/1987 | Ishida et al. . | |
| 4,829,170 | 5/1989 | Ishida et al. . | |
| 4,872,058 | 10/1989 | Baba et al. . | |
| 4,992,817 | 2/1991 | Aoyama et al. . | |
| 5,126,849 | 6/1992 | Senuma et al. ............................ | 348/353 |
| 5,258,847 | 11/1993 | Yamada et al. ............................ | 348/356 |
| 5,260,736 | 11/1993 | Toji ............................ | 354/402 |
| 5,432,552 | 7/1995 | Takuma et al. ............................ | 348/349 |

*Primary Examiner*—Howard B. Blankenship

[57] ABSTRACT

An image sensor and a focus detection device or distance detection device using the image sensor, wherein the accumulation time of the image sensor is controlled by a characteristic value of the subject image signals without all subject image signals produced by the image sensor having to undergo analog-to-digital conversion. The image sensor includes a light receiving unit having a light receiving element. The image sensor produces electric charges corresponding to light incident on the light receiving element, accumulates the corresponding electric charges, produces a charge signal corresponding to the accumulated electric charges and outputs the charge signal so that the charge signal can be provided to a device which is external to the image sensor. A characteristic value detection unit is also provided inside the image sensor which receives the charge signal from the light receiving unit, detects a characteristic value based on the charge signal and outputs a characteristic signal corresponding to the detected characteristic value. In this manner, the characteristic value is determined from an analog charge signal before the charge signal is converted to digital form.

17 Claims, 7 Drawing Sheets

IMAGE SENSOR WITH ACCUMULATION TIME OF ELECTRIC CHARGES DETERMINED BY SUBJECT IMAGE SIGNALS

BACKGROUND OF THE INVENTION

1. Field of the Invention

The present invention is related to a focus detection device or distance detection device equipped with an image sensor, wherein the electric charge accumulation time of the image sensor is controlled by a characteristic value of a subject image signal.

2. Description of the Related Art

Focus detection devices and distance detection devices using image sensors are known and used in cameras. These devices typically perform the following steps: (1) subject image signals, relating to accumulated electrical charges in a charge coupled type image sensor, are output in series from the image sensor to a microcomputer, that is, the electric charges are "read" by the microcomputer; (2) the subject image signals undergo analog-to digital (AD) conversion by an AD converter built into the microcomputer, the subject image signals thereby becoming subject image data; and (3) the microcomputer then computes and processes the subject image data and calculates the focus condition and the subject distance.

For the next reading of electrical charges (that is, when step 1 is repeated), the electric charge accumulation time of the image sensor is controlled in relation to characteristic values of the subject image data. Such characteristic values can include peak value, average value and/or contrast value. By controlling the accumulation time in relation to a characteristic value, the level of the subject image signals are optimized for the focus condition and distance detection.

In a conventional system, the microcomputer determines the characteristic value of the image signals. This function of determining the characteristic value is not included as part of the image sensor.

When controlling the accumulation time of the charge coupled type image sensor for the next reading based on the current reading of subject image data, it is necessary to continuously operate the image sensor while (a) incorporating the subject image data into the microprocessor via analog-to-digital conversion; and (b) controlling the discharge time of the image sensor so that the subject image signal levels for the focus condition and distance detection are accurate.

Even if focus or distance is not being detected, the image sensor must be continuously operated and steps (a) and (b) must be continuously performed until the subject image signal levels become accurate. This continuous operation is necessary to provide adequate responsiveness when focus detection or distance detection is activated. If the image sensor is not continuously operated and steps (a) and (b) are not continuously performed, the responsiveness of focus detection and distance detection can be inadequate. Therefore, all subject image signals from the image sensor must constantly undergo analog-to-digital conversion and the subject image data must be constantly incorporated into the microcomputer in order to prepare for initiating focus detection and distance detection. As a result, even if focus detection and distance detection are not being performed, the microcomputer must continue to perform analog-to-digital conversion.

Therefore, processing power which could be useful to perform other functions (for example, exposure control) is not available and, instead, must be used to perform analog-to-digital conversion. Moreover, some devices may be capable of focus and distance detection in multiple regions. These devices can typically select one focus detection region from among multiple focus detection regions. However, even if focus and distance are being detected for only one selected focus detection region, a burden is placed on the microcomputer since the action of incorporating the subject image data for the focus detection regions which were not selected must still be performed. This incorporation of the subject image data for non-selected focus detection regions is performed in parallel with the focus detection of the selected focus detection region. As a result, the responsiveness of the focus detection and distance detection operations is decreased.

SUMMARY OF THE INVENTION

Accordingly, it is an object of the present invention to provide an improved image sensor and a focus detection device/distance detection device which utilizes the improved image sensor.

It is an object of the present invention to provide an image sensor in which the accumulation time of electrical charges in the image sensor is controlled based upon a characteristic value of subject image signals.

It is a further object of the present invention to provide a focus detection device and/or a distance detection device using a charge coupled type image sensor which, when focus detection and/or distance detection are not being performed, does not require the analog-to-digital conversion of all subject image signals to obtain accurate subject image signal levels.

It is yet a further object of the present invention to provide the above, improved image sensor suitably adapted for use in a camera.

Additional objects and advantages of the invention will be set forth in part in the description which follows and, in part, will be obvious from the description, or may be learned by practice of the invention.

The foregoing objects of the present invention are achieved by providing an image sensor comprising a light receiving unit which includes a light receiving element and produces electric charges corresponding to light incident on the light receiving element, accumulates the electric charges, produces a charge signal corresponding to the accumulated electric charges and outputs the charge signal so that the charge signal can be provided to a device which is external to the image sensor, and a characteristic value detection unit which receives the charge signal from the light receiving unit, detects a characteristic value based on the charge signal and outputs a characteristic signal corresponding to the detected characteristic value.

The foregoing objects are also achieved by providing a focus detection device which detects a focus condition of a main optical system, comprising a charge coupled type light receiving unit which includes a light receiving element that accumulates electric charges over an electric charge accumulation time, the light receiving unit outputting an analog charge signal corresponding to the accumulated electric charges, a characteristic value detection unit which receives the analog charge signal from the light receiving unit, detects a characteristic value of the charge signal and outputs an analog characteristic signal corresponding to the characteristic value, an analog-to-digital conversion unit which receives the analog charge signal and the analog characteristic signal and converts the analog charge signal into a digital charge signal and the analog characteristic signal into a digital characteristic signal, a computational unit which receives the digital charge signal and the digital characteristic signal and computes a focus condition of the main optical system based on the digital charge signal and the digital characteristic signal, and an accumulation control unit which controls the electric charge accumulation time of the light receiving element based on the digital characteristic signal.

In addition, the foregoing objects are achieved by providing a focus detection device for use with a main optical system, the focus detection device detecting a focus condition corresponding to a respective focus detection region of multiple focus detection regions, the focus detection device comprising a charge coupled type light receiving unit which includes a light receiving element that accumulate electric charges over an electric charge accumulation time, the light receiving element corresponding to one of the multiple focus detection regions and outputting an analog charge signal corresponding to the accumulated electric charges, a characteristic value detection unit which receives the corresponding analog charge signal from the light receiving unit, detects a characteristic value of the corresponding analog charge signal and outputs an analog characteristic signal corresponding to the characteristic value, an analog-to-digital conversion unit which receives the analog charge signal and the analog characteristic signal and converts the analog charge signal into corresponding digital charge signal and the analog characteristic signal into a corresponding digital characteristic signal, a computational unit which receives the digital charge signal and the digital characteristic signal and computes a corresponding focus condition of the main optical system based on the digital charge signal and the digital characteristic signal, and an accumulation control unit which controls the electric charge accumulation time of the light receiving element based on the digital characteristic signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
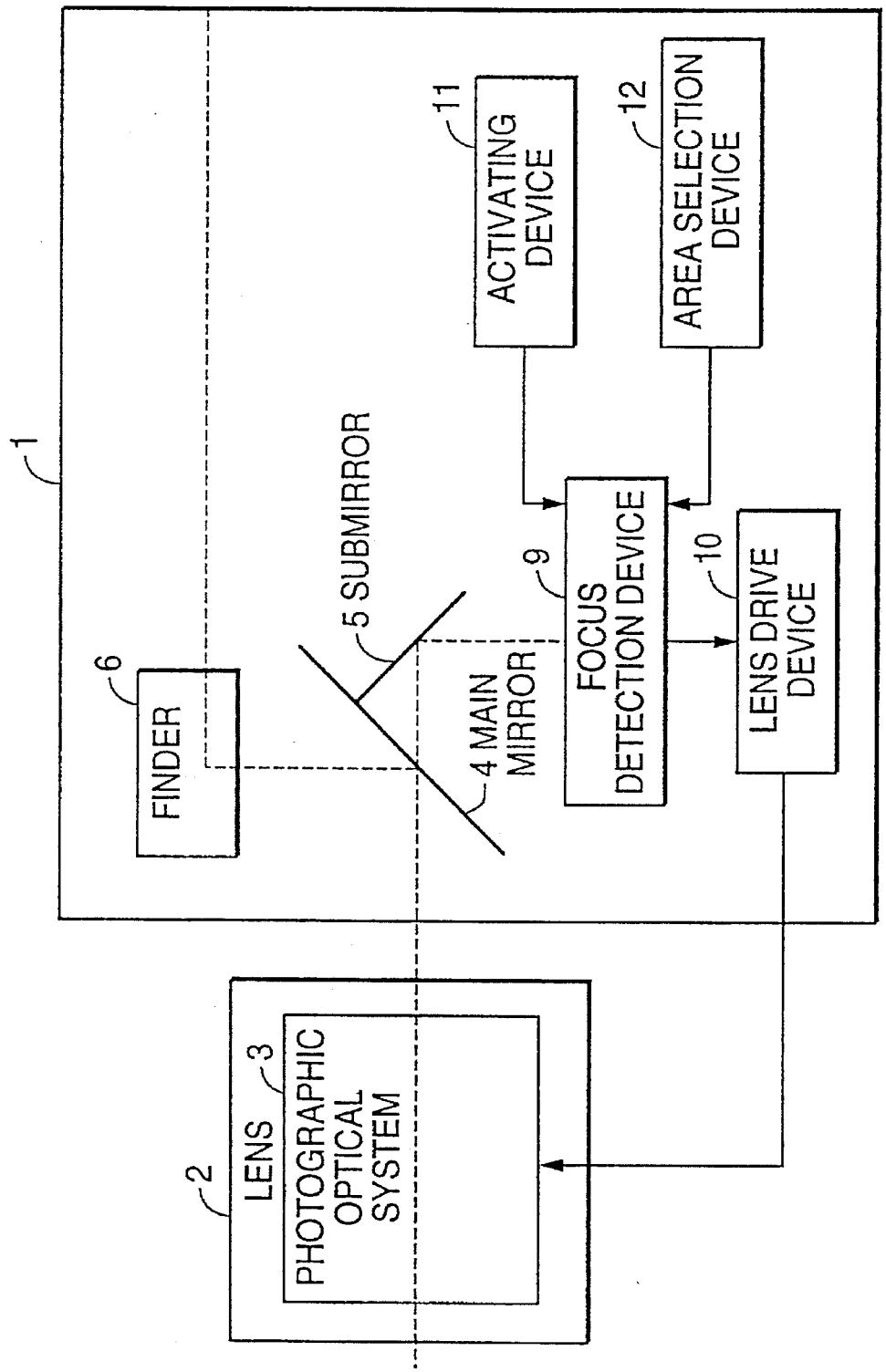
FIG. 1 is a block diagram of an apparatus according to an embodiment of the present invention as used in a camera according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram of an apparatus according to an embodiment of the present invention as used in a camera according to an embodiment of the present invention. In FIG. 1, there is shown a camera body 1 and lens 2 is attachable to and removable from body 1. Light fluxes from a subject are transferred into body 1 by photographic optical system 3 within lens 2. The light fluxes from a subject pass through photographic optical system 3 and are split by main mirror 4 into the directions of submirror 5 and viewfinder (finder) 6. Main mirror 4 is a half mirror. Light fluxes travelling in the direction of submirror 5 are reflected by submirror 5 and are incident upon focus detection device 9.

Focus detection device 9 is arranged in the vicinity of a prearranged focus plane of photographic optical system 3.

A subject image can be focused on a film plane (not illustrated) or a subject image storage device (not illustrated) by the above apparatus.

A photographer selects a focus detection area from multiple focus detection areas displayed on a photographic screen (not illustrated). The focus detection areas are selected by a photographer via area selection device 12. Focus detection device 9 detects a focus condition of photographic optical system 3 for the selected focus detection area. Focus detection device 9 controls lens drive device 10 corresponding to the results of the detection of the focus condition by focus detection device 9. Lens drive device 10 comprises a motor (not illustrated) and moves photographic optical system 3 along the direction of the optical axis in order to adjust the focus condition.

Activating device 11 activates a focus detection operation or an auto focus operation of focus detection device 9. Activating device 11 can be combined, for example, with a shutter release button (not illustrated) which operates to control the opening/closing of the camera shutter (not illustrated). When the release button is not pressed, the focus detection operation or automatic focus operation of focus detection device 9 is prohibited and, by pressing the release button half-way to a "half-push" state, the focus detection operation or automatic focus operation of focus detection device 9 is activated. The shutter is opened by pressing the release button all the way down to a "full-push" state. In this manner, focus detection or adjustment begins when a photographer presses the release button to the half-push state.

Lens drive device 10 exchanges signals with focus detection device 9, area selection device 12 and activating device 11.

Since focus detection device 9 can perform focus detection for multiple focus detection areas within the photographic screen, area selection device 12 manually or automatically selects the specified focus detection area.

Figure 2:
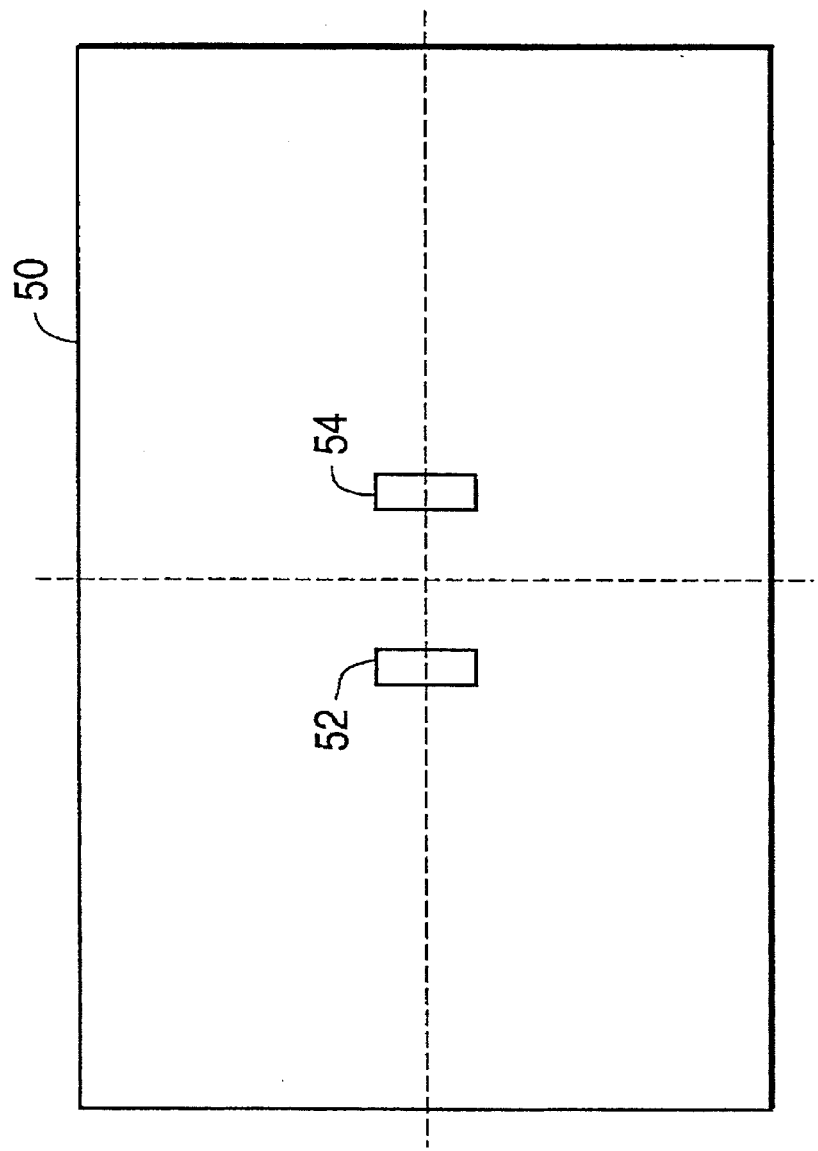
FIG. 2 is a diagram indicating the arrangement of focus detection regions on a photographic screen according to an embodiment of the present invention.

FIG. 2 illustrates a present embodiment of the present invention in which a viewfinder screen 50 displays first focus detection area 52 and a second focus detection area 54. Area selection device 12 selects either first focus detection area 52 or second focus detection area 54, but not both, at one particular time. However, a similar system could provide multiple focus detection areas and allow a photographer to select more than one of the focus detection areas at a particular time. First focus detection area 52 corresponds to first light receiving parts 80 and 81 (see FIG. 3) and second focus detection area 54 corresponds to second light receiving parts 82, 83 (see FIG. 3).

Figure 3:
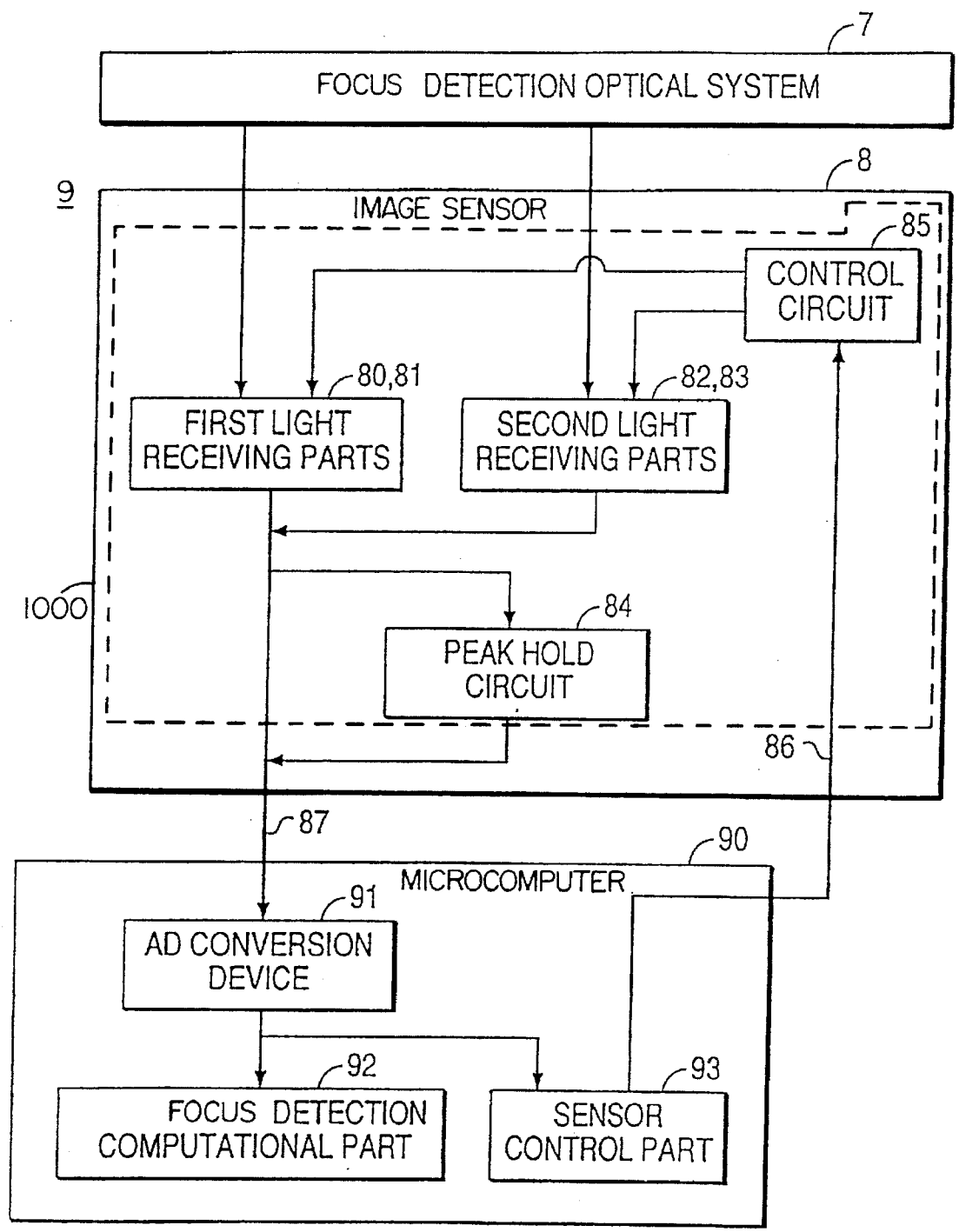
FIG. 3 is a block diagram of a focus detection device according to an embodiment of the present invention.

FIG. 3 illustrates the configuration of focus detection device 9. As shown in FIG. 3, focus detection device 9 comprises focus detection optical system 7, image sensor 8, and microcomputer 90.

Image sensor 8 comprises first light receiving parts 80 and 81, second light receiving parts 82 and 83, peak hold circuit 84 and control circuit 85.

Microcomputer 90 comprises analog-to-digital (AD) conversion device 91, focus detection computational part 92 and sensor control part 93.

Figure 4:
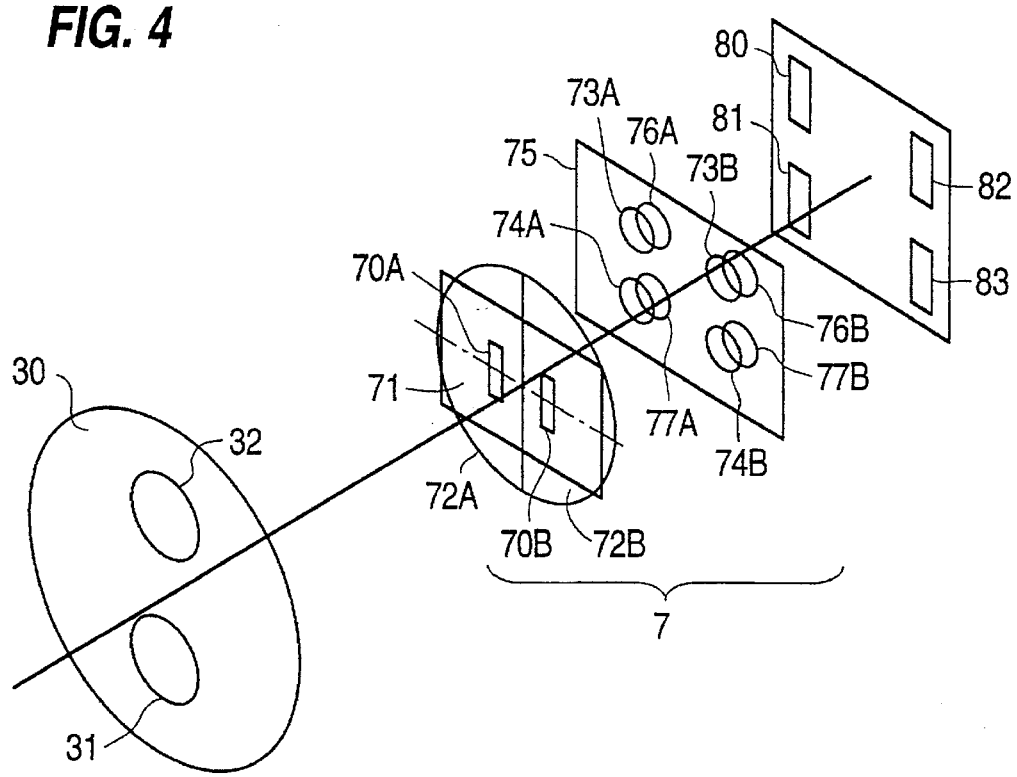
FIG. 4 is an perspective view diagram of a configuration of a focus detection optical system according to an embodiment of the present invention.

First, focus detection optical system 7 will be explained with reference to FIG. 4, which indicates a configuration of focus detection optical system 7 within focus detection device 9. Focus detection optical system 7 comprises visual field mask 71, which includes opening parts 70A and 70B; aperture mask 75, which has two pairs of aperture opening parts 73A, 74A, and 73B, 74B; and two pairs of image reforming lenses 76A, 77A, and 76B, 77B.

A pair of regions 31, 32 are provided which are symmetrical to the optical axis of plane 30 positioned near the exit light pupil of photographic optical system 3. Light fluxes from the pair of regions 31, 32 are projected onto the two pairs of aperture opening parts 73A, 74A, and 73B, 74B by condenser lenses 72A and 72B. The light fluxes that pass through these regions 31 and 32 first form a primary image in the vicinity of field mask 71. The primary image that is formed on opening parts 70A and 70B of field mask 71 further pass through condenser lenses 72A and 72B, and the pairs of aperture opening parts 73A, 74A, and 73B, 74B, and are formed into a pair of secondary images on light receiving parts 80 and 81 and light receiving parts 82 and 83 of image sensor 8 by the two pairs of image reforming lenses 76A, 77A, and 76B, 77B. (The actual optical axis is bent by submirror 5 in FIG. 1).

Next, image sensor 8 of FIG. 3 will be explained. Image sensor 8 is a charge coupled type image sensor and comprises first light receiving parts 80 and 81 (see also FIG. 4), second light receiving parts 82 and 83 (see also FIG. 4), peak hold circuit 84 and control circuit 85. First light receiving parts 80 and 81, second light receiving parts 82 and 83, peak hold circuit 84 and control circuit 85, which collectively comprise image sensor 8, are preferably packaged as one chip on the same semiconductor substrate 1000.

The first light receiving parts 80 and 81 each comprise multiple pixels, receive the optical subject image from focus detection optical system 7, and output subject image signals which represent electric charges that have accumulated on the pixels over a period of time.

Second light receiving parts 80 and 81 each comprise multiple pixels, receive the optical subject image from focus detection optical system 7, and output subject image signals which represent electric charges that have accumulated on the pixels over a period of time.

Peak hold circuit 84 is arranged in parallel with output line 87. In a time interval in which the subject image signals of the first light receiving parts or the second light receiving parts are being output and sent, peak hold circuit 84 detects and stores the peak value (the signal value corresponding to the brightest part) of the subject image signals, and outputs the peak value detected at the point in time that the output transmission of the subject image signals is complete.

Control circuit 85 produces a transmission start signal, a transmission complete signal and a transmission pulse signal in order to respectively begin, complete and transmit the electric charge accumulation of first light receiving parts 80 and 81 and second light receiving parts 82 and 83. Also, control circuit 85 controls first light receiving parts 80 and 81 independently from second light receiving parts 82 and 83.

First light receiving parts 80 and 81 and second light receiving parts 82 and 83 accumulate the electric charges of the pair of subject images that are respectively formed on first light receiving parts 80 and 81 and second light receiving parts 83 and 83 by focus detection optical system 7. Electric charges are accumulated only during accumulation times specified by control signals output from control circuit 85. The electric charges accumulated on first light receiving parts 80 and 81 and second light receiving parts 82 and 83 correspond to the intensity distribution of the subject images. Transmission pulse signals represent the respective accumulated charges and are analog subject image signals for each individual pixel of first light receiving parts 80 and 81 and second light receiving parts 82 and 83. The transmission pulse signals are transmitted in series on output line 87 to microcomputer 90 by a well-known CCD shift register (not illustrated) which is jointly provided for the respective light receiving parts 80, 81, 82 and 83.

Moreover, control circuit 85 controls the transmission timing of first light receiving parts 80 and 81 and second light receiving parts 82 and 83 so that the output of first light receiving parts 80 and 81 and second light receiving parts 82 and 83 are not simultaneously transmitted on output line 87.

Also, the detected peak value is provided to microcomputer 90 through output line 87 by peak hold circuit 84; however, the peak value is not provided until the output transmission of the subject image signal is completed.

The relative positional relationship between the pair of secondary images on light receiving parts 80 and 81 and the pair of secondary images on light receiving parts 82 and 83 is varied to correspond to the focus condition of photographic optical system 3. By detecting the relative positional relationship of the respective pairs of secondary images, microcomputer 90 detects the focus condition of photographic optical system 3.

Microcomputer 90 controls the accumulation times of first light receiving parts 80 and 81 and second light receiving parts 82 and 83 within image sensor 8 and detects the focus. Microcomputer 90 comprises an analog-to-digital (AD) conversion device 91, focus detection computational part 92, and sensor control part 93.

AD conversion device 91 is connected to output line 87 and performs analog-to-digital conversion of the subject image signals and the peak signals. If the first focus detection area 52 is selected by area selection device 12, the subject image signals and peak signals corresponding to first light receiving parts 80 and 81 and the peak signals corresponding to second light receiving parts 82 and 83 undergo analog-to-digital conversion; however, the subject image signals corresponding to second light receiving parts 82 and 83 do not undergo analog-to-digital conversion. Also, if the second focus detection area 54 is selected by area selection device 12, the subject image signals and peak signals corresponding to second light receiving parts 82 and 83 and the peak signals corresponding to the first light detecting parts 80 and 81 undergo analog-to-digital conversion; however, the subject image signals corresponding to first light receiving parts 80 and 81 do not undergo analog-to-digital conversion.

If the first focus detection area 52 is selected by area selection device 12, focus detection computational part 92 detects the focus condition of the first focus detection area 52 based on the subject image data that has undergone analog-to-digital conversion corresponding to first light receiving parts 80 and 81. Moreover, if the second focus detection area 54 is selected by area selection device 12, focus detection computational part 92 detects the focus condition of the second focus detection area 54 based on the subject image data that has undergone analog-to-digital conversion corresponding to second light receiving parts 82 and 83. Focus detection is well-known.

Sensor control part 93 determines the accumulation time for first light receiving parts 80 and 81 and second light receiving parts 82 and 83 so that the output levels of the subject image signals which are respectively output from first light receiving parts 80 and 81 and second light receiving parts 82 and 83 are accurately gathered within the analog-to-digital conversion range of AD conversion device 91. Sensor control part 93 sends a command through control line 86 to control circuit 85 and controls the accumulation time of first light receiving parts 80 and 81 and second light receiving parts 82 and 83.

If the analog-to-digital value of the peak signal corresponding to first light receiving parts 80 and 81 equals PA, the accumulation time when the peak signal has been obtained equals TAP, the analog-to-digital value of the peak signal corresponding to second light receiving parts 82 and 83 equals PB, the accumulation time when the peak signal is obtained equals TBP, and an index peak value equals PX, then the accumulation times TAN and TBN of the next readings for first light receiving parts 80 and 81 and second light receiving parts 82 and 83, respectively, are calculated from the following Formula 1:

$$TAN = TAP \times PX/PA$$

$$TBN = TBP \times PX/PB$$

By determining the accumulation time of the next reading according to Formula 1, it can be anticipated that the peak value of the next reading will be the index value PX.

Since the subject image signals corresponding to the respective focus detection area 52 or 54 that is not selected do not have to undergo analog-to-digital conversion, microcomputer 90 can do other work instead of performing an unnecessary analog-to-digital conversion process. Also, because the accumulation time of the focus detection area that is not selected is controlled and operated so that the subject image signal level is accurate, the system responsiveness is improved because subject image signals at an accurate level are quickly obtained and focus detection computations can be performed. Responsiveness is improved even if the selected focus detection area 52 or 54 is switched.

Moreover, output line 87 is used in common by first light receiving parts 80 and 81 and second light receiving parts 82 and 83. As a result, there is an advantage in that the number of input/output lines can be kept down and only one peak hold circuit 84 is needed. Also, the number of input/output lines can be restricted even further since peak hold circuit 84 jointly uses output line 87 with the respective subject image signals.

Figure 5:
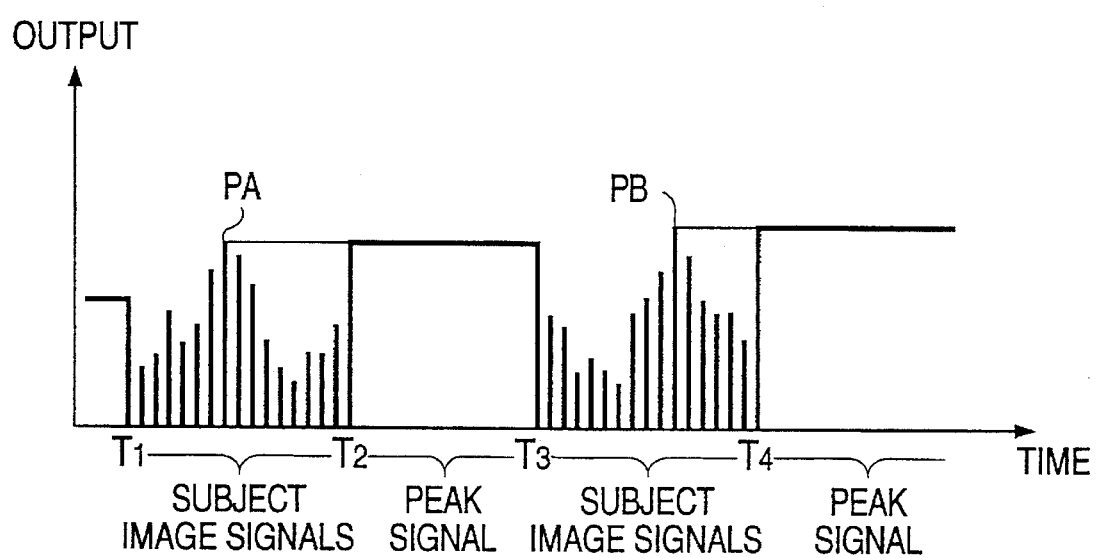
FIG. 5 is a timing chart indicating the output of an image sensor according to an embodiment of the present invention.

FIG. 5 is a timing chart which illustrates the output of image sensor 8. The accumulation of first light receiving parts 80 and 81 is completed at time T1. The transmission of electric charges that were accumulated at first light receiving parts 80 and 81 is then begun at T1. In FIG. 5, the subject image signals are shown as respective transmission pulses. When the transmission of all transmission pulses is completed at time T2, the peak value of the subject image signal that was output between time T1 through time T2 is output as the peak signal. The accumulation of second light receiving parts 82 and 83 is completed at time T3. At time T3, the transmission of the electric charges accumulated at second light receiving parts 82 and 83 is begun and the subject image signals are output in the place of the peak signals. Therefore, between time T3 and time T4, the signals of each pixel of second light receiving parts 82 and 83 are output to correspond with the transmission pulse signals. The transmission is completed at time T4 and the peak value of the subject image signals that was output during the interval between time T3 and time T4 is output as the peak signal.

Figure 6:
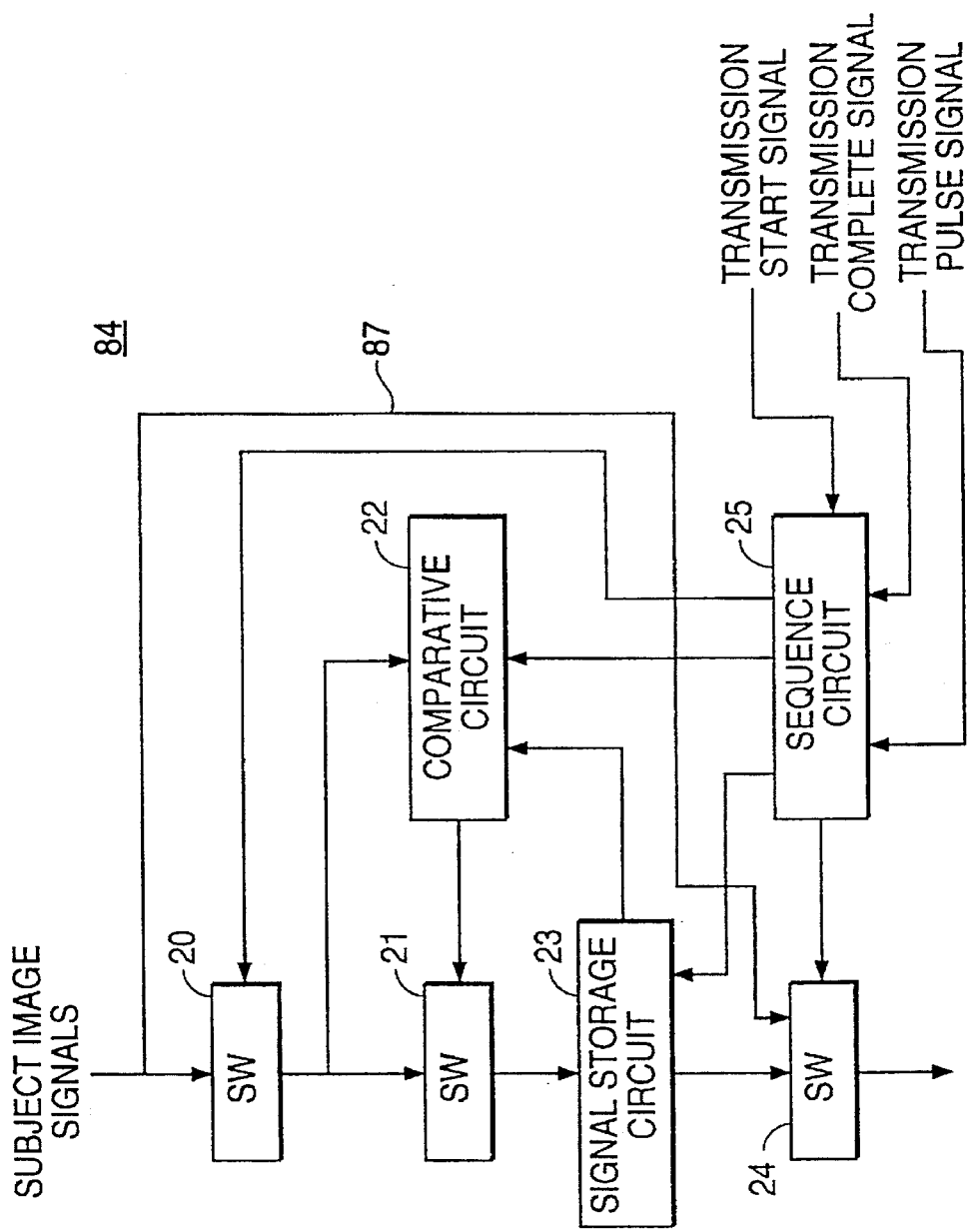
FIG. 6 is a block diagram of a configuration of a peak hold circuit according to an embodiment of the present invention.

FIG. 6 is a block diagram indicating the configuration of peak hold circuit 84 incorporated with output line 87 to provide a configuration that operates as shown in FIG. 3. Peak hold circuit 84 comprises switch SW 20, switch SW 21, switch SW 24, comparative circuit 22, signal storage circuit 23 and sequence circuit 25.

SW 20 is used to switch whether or not the subject image signal is input to SW 21, based on a control signal from sequence circuit 25.

SW 21 receives the subject image signal from SW 20 and is used to switch whether or not the subject image signal is input to signal storage circuit 23, based on a control signal from comparative circuit 22.

SW 24 receives the subject image signals and a signal output from signal storage circuit 23 and is used to select which of these signals will be output, based on a control signal from sequence circuit 25.

Comparative circuit 22 receives the subject image signal output from SW 20 and the output of signal storage circuit 23 and compares these signals, based on a control signal from sequence circuit 25.

Signal storage circuit 23 stores subject image signals that were output from SW 21 and outputs these stored signals to comparative circuit 22 and SW 24, based on the control signal from sequence circuit 25.

Sequence circuit 25 receives the following signals from control circuit 85: (a) a transmission start signal which indicates the start of the transmission of the subject image signals, (b) a transmission complete signal which indicates the completion of transmission, and (c) a transmission pulse signal which indicates the transmission timing for each pixel configured in first light receiving parts 80 and 81 and second light receiving parts 82 and 83. Sequence circuit 25 controls the operation of SW 20, comparative circuit 22, signal storage circuit 23, and SW 24 corresponding to the transmission start signal, the transmission complete signal and the transmission pulse signal.

Sequence circuit 25 resets the signal storage circuit 23 when the transmission start signal is received, thereby setting the stored signal to a zero level.

The subject images are input to SW 20 and SW 24. The output from signal storage circuit 23 is also input to SW 24. In the time interval when the subject image signals are being transmitted, sequence circuit 25 controls SW 20 so that the subject image signals pass to SW 21 and comparative circuit 22 and controls SW 24 so that the subject image signal are output.

During the period of subject image signal transmission, comparative circuit 22 compares the level of the output signal of signal storage circuit 23 with the level of the subject image signal for every pixel synchronous to the transmission pulse signal. If the level of the subject image signal exceeds the level of the output signal from signal storage circuit 23, SW 21 is controlled so that a "storage operation" is performed wherein the subject image signals pass to signal storage circuit 23 and are stored. If this "storage operation" is performed for every pixel during the transmission time, the peak signal among the subject image signals will be stored in signal storage circuit 23 when the transmission of the subject image signal is complete.

Sequence circuit 25 controls SW 24 in correspondence with the transmission complete signal so that signal stored in the signal storage circuit 23 is output when transmission of the subject image signals is complete. As a result, the peak value of the subject image signal is output in correspondence with the completion of the subject image signal transmission.

Figure 7:
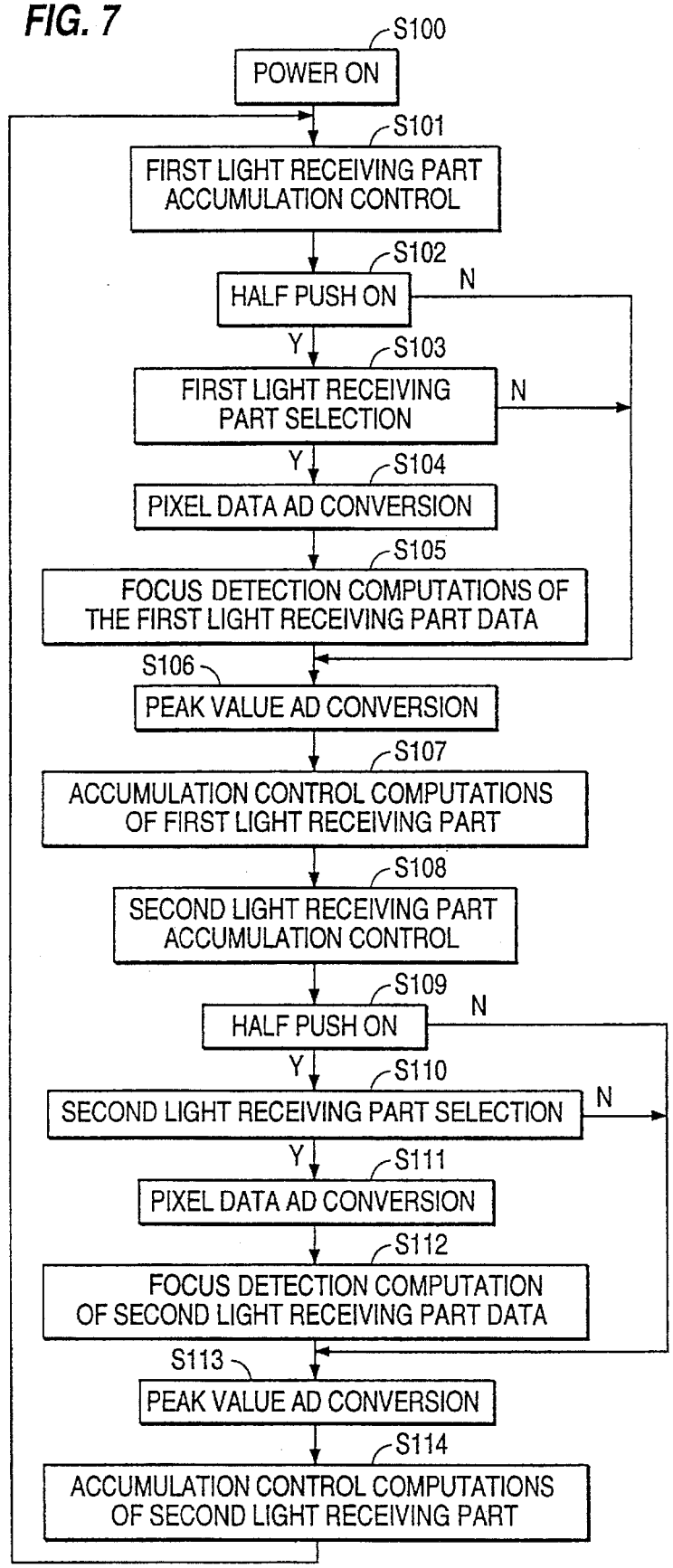
FIG. 7 is a flow chart indicating an operational sequence of a microcomputer according to an embodiment of the present invention.

FIG. 7 is a flow chart of a processing sequence for microcomputer 90 of a present embodiment of the present invention. Referring to FIG. 7, the process starts at step S100 and advances to step S101 by turning the power ON.

At step S101, the electric charge accumulation of first light receiving parts 80 and 81 is executed. When the power is initially turned ON, the accumulation time is set at an initial fixed value or a value that corresponds to the output from a light measuring device (not illustrated). If the power was not initially just turned ON, the accumulation time TAN computed in step S107 (discussed later) from Formula 1 is adopted. The accumulation time used in step S101 is stored as TAP.

In step S102, it is determined whether or not the release button is in the half-push state or in an "open" state (that is, the release button in not being pressed). If, in step S102, the release button is in the open state, the focus detection of the first focus detection area 52 corresponding to first light receiving parts 80 and 81 is not executed and the flow advances to step S106. If, in step S102, the release button is pressed half way down, the flow advances to step S103 and the focus detection operation or the automatic focus operation is activated.

At step S103, area selection device 12 tests whether or not the first focus detection area 52, corresponding to first light receiving part 80 and 81, is selected. If, in step S103, first light receiving parts 80 and 81 are selected, flow advances to step S104. If, in step S103, first light receiving parts 80 and 81 are not selected, flow advances to step S106 without detecting the focus of the first focus detection area 52.

At step S104, the subject image signals undergo analog-to-digital conversion for every pixel.

At step S105, well-known image discrepancy detection calculations are conducted based on the analog-to-digital conversion data obtained in step S104 and the focus condition of the first focus detection area 52 is detected.

At step S106, the peak signal, which appears at the completion of transmitting the subject image signals, undergoes analog-to-digital conversion and the peak value PA is calculated.

At step S107, the accumulation time TAN for the next reading is calculated and stored, based on Formula 1 using the peak value PA and the accumulation time TAP. The process then advances to step S108.

At step S108, the electric charge accumulation operation of second light receiving parts 82 and 83 is conducted. If the power has just initially been turned ON, the accumulation time is a fixed value or a value that corresponds to the output of a light measuring device (not illustrated) and, if the power was not just initially turned ON, the accumulation time TBN determined in step S114 (discussed later) by Formula 1 is adopted as the accumulation time. The accumulation time used in step S108 is stored as TBP.

At step S109, it is determined whether or not the release button has been pressed to the half-push state or is in the open state. If the release button is in the open state in step S109, the flow advances to step S113 without detecting the focus of the second focus detection area 54. If the release button is in the half-push state in step S109, the process advances to step S110 and the focus detection operation or the automatic focus operation is activated.

In step S110, area selection device 12 determines whether or not the second focus area 54, corresponding to second light receiving parts 82 and 83, is selected. If, in step S110, the second focus detection area 54 is selected, the flow advances to step S111 and, if the second focus detection area 54 is not selected, the flow advances to step S113 without detecting the focus of the second focus detection area 54.

At step S111, the subject image signals undergo analog-to-digital conversion for every pixel.

At step S112, well-known image discrepancy detection calculations are executed based on the analog-to-digital conversion data obtained in step S111 and the focus condition of the second focus detection area 54 is detected.

At step S113, the peak signal, which appears after the transmission of the subject image signals is completed, undergoes analog-to-digital conversion and peak value PB is calculated.

At step S114, accumulation time TBN for the next reading is computed and stored, based on Formula 1 using peak value PB and accumulation time TBP. Then the flow returns to step S101 and the process is repeated.

In the present embodiment of the present invention, the peak hold circuit 84, which detects the peak value of the subject image, is provided in image sensor 8. After the transmission of the subject image signals is completed, the detected peak value is output to microprocessor 90.

Microprocessor 90 waits to control the accumulation time of image sensor 8 using the peak value; however, the present invention is not intended to be limited to the control of accumulation time based on the peak value. Data other than the peak value of the subject image signals may express the characteristics of the subject image signals and be output. For example, various characteristics of a subject image signal can represent a "characteristic value" and a circuit which detects the "characteristic value" would be a "characteristic value detection unit". The characteristic value detection unit is preferably incorporated into image sensor 8. The characteristic value detected by the characteristic value detection unit is output to microprocessor 90 after the transmission of the subject image signals is complete, wherein microprocessor 90 controls the accumulation time of the next reading of the image sensor based on the characteristic value.

The following is an explanation of how the accumulation time is controlled using the average value of the subject image signals. The average value of the subject image signals of a current reading equals SP, the accumulation time of the current reading equals TP, and the index average value of the next reading equals SX. Therefore, the accumulation time TN of the next reading can be calculated as follows in Formula 2:

$$TN = TP \times SX / SP \qquad \text{Formula 2}$$

By determining the accumulation time for the next reading in this manner, it can be expected that the average value of the subject image of the next reading will be the index value SX.

Figure 8:
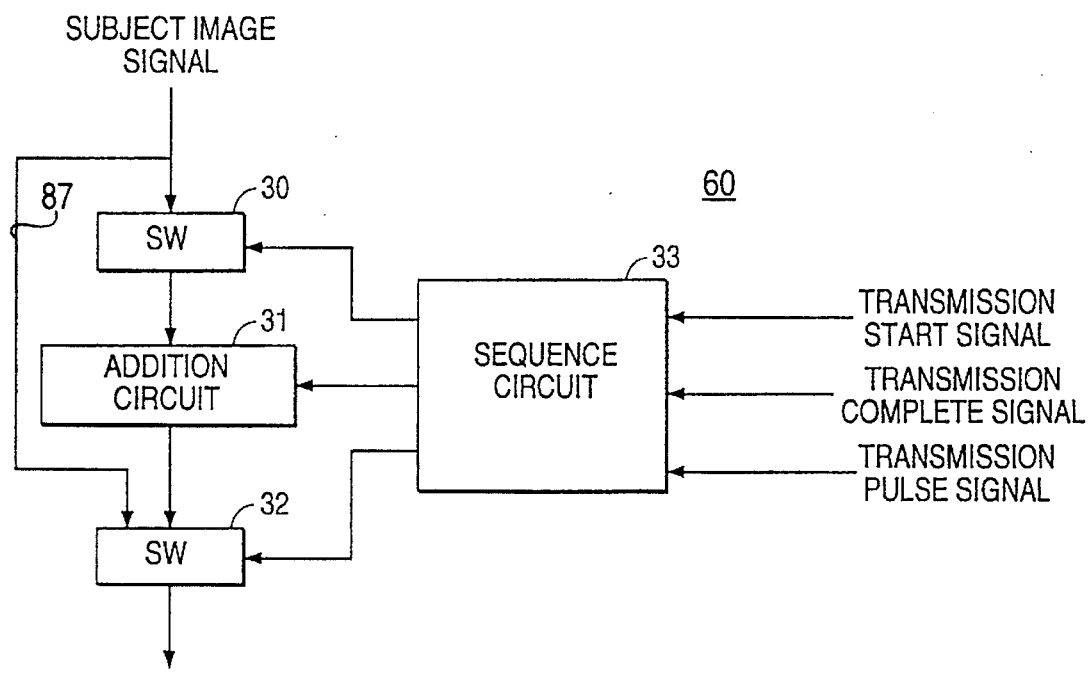
FIG. 8 is a block diagram of a configuration of an average value detection circuit according to an embodiment of the present invention.

FIG. 8 is a block diagram indicating the configuration of an average value detection circuit 60 incorporated into image sensor 8 when the accumulation time control is executed using the average value. This can be accomplished by replacing peak hold circuit 84 of FIG. 3 with the average detection circuit 60 of FIG. 8.

The average value detection circuit 60 comprises switch SW 30, switch SW 32, addition circuit 31, and sequence circuit 33. SW 30 is used to select whether or not the subject image signal is input to addition circuit 31, based on a control signal from sequence circuit 33. SW 32 receives the subject image signal and the output from addition circuit 31 and is used to select which signal will be output, based on a control signal from sequence circuit 33. Addition circuit 31 receives the subject image signal from SW 30, adds the subject image signals and outputs the results to SW 32, based on a control signal from sequence circuit 33.

Sequence circuit 33 receives: (a) the transmission start signal, which expresses the transmission start time of the subject image signals, (b) the transmission complete signal, which expresses the time in which transmission is complete, and (c) the transmission pulse signal, which expresses the transmission timing of every pixel of the respective first and second light receiving parts 80, 81, 82 and 83. Sequence circuit 33 controls the operations of SW 30, addition circuit 31 and SW 32 corresponding to the transmission start signal, the transmission complete signal and the transmission pulse signal.

The subject image signal is input to SW 30 and SW 32. Also, the output of addition circuit 31 is input to SW 32. In the time interval that the subject image signals are being transmitted, sequence circuit 33 controls SW 30 so that the subject image signals are input to addition circuit 31, and selects SW 32 so that the subject image signals are output.

When receiving a transmission start signal, sequence circuit 33 resets addition circuit 31 and sets an addition signal of addition circuit 31 to a zero level.

Synchronous to the transmission pulse signal, addition circuit 31 continues to calculate a value which is the output of the pixels divided by the total number of pixels. The calculated value is repeatedly updated. Eventually, when the transmission of the subject image signals is complete, addition circuit 31 will be storing a signal corresponding to the average value of the subject image signals.

At the transmission complete signal, sequence circuit 33 controls SW 32 so that the signal stored in addition circuit 31 is output. Consequently, the average value of the subject image signals is output in correspondence with the completion of the subject image signal transmission.

The accumulation time can also be controlled, for example, by using the maximum contrast value of the subject image signals as the characteristic value. The maximum contrast value is defined as the maximum value of the absolute value of the difference in the output of a given pixel and a pixel that is adjacent to given pixel or several pixels away from the given pixel.

When controlling the accumulation time using the maximum contrast value of the subject image signals as the characteristic value, if the maximum contrast value of the subject image signals of a current reading is CP, the accumulation time of the current reading is TP, and the index maximum contrast value of the next reading is CX, then the accumulation time TN of the next reading can be calculated as in the following Formula 3:

$$TN=TP \times CX/CP \quad \text{Formula 3}$$

By determining the accumulation time of the next reading in according to Formula 3, it can be anticipated that the maximum contrast value of the subject image of the next reading will be the index value CX.

Figure 9:
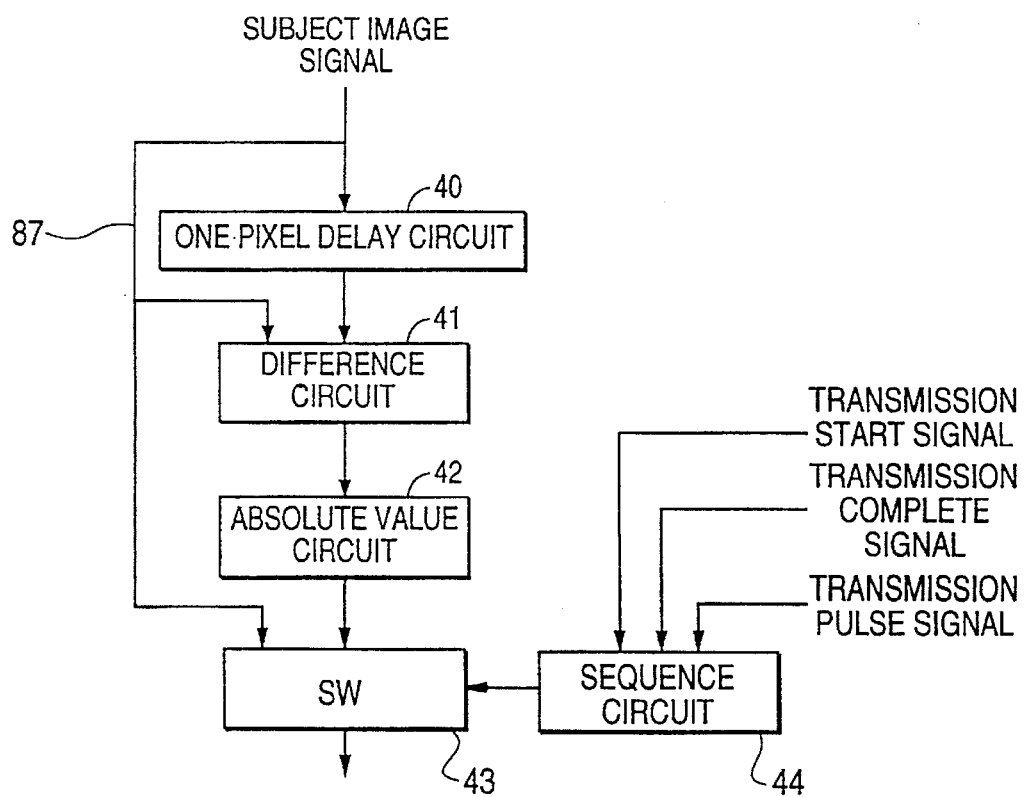
FIG. 9 is a block diagram of a configuration of a maximum contrast detection circuit according to an embodiment of the present invention.

FIG. 9 is a block diagram indicating the configuration of a maximum contrast value detection circuit 62 which is incorporated into image sensor 8 of FIG. 3 in place of peak hold circuit 84 when accumulation time is controlled by the maximum contrast value of the subject image signals. With this configuration, the maximum value of the contrast of the subject image signals is output corresponding to the completion of the subject image signal transmission. Maximum contrast value detection circuit 62 comprises one pixel delay circuit 40, difference circuit 41, absolute value circuit 42, switch SW 43 and sequence circuit 44. The subject image signals are received by one pixel delay circuit 40 and difference circuit 41 and the output of absolute value circuit 42 is fed into SW 43. SW 43 also receives output line 87.

Sequence circuit 44 operates in a similar manner to sequence circuit 33 in FIG. 8 and receives: (a) the transmission start signal, which expresses the transmission start time of the subject image signals, (b) the transmission complete signal, which expresses the time in which transmission is complete, and (c) the transmission pulse signal, which expresses the transmission timing of every pixel of the respective first and second light receiving parts 80, 81, 82 and 83. Sequence circuit 44 controls the operations of SW 43 corresponding to the transmission start signal, the transmission complete signal and the transmission pulse signal.

In FIG. 9, one pixel delay circuit 40 receives the subject image signal and delays the subject image signal for just one pixel.

Difference circuit 41 receives the subject image signal and the delayed subject image signal from the one pixel delay circuit 40 and determines the difference between the subject image signal and the delayed subject image signal.

Absolute value circuit 42 receives the output of difference circuit and produces a value derived from taking the absolute value of the output of difference circuit 41. SW 43 receives the subject image signal and the output from absolute value circuit 42 and is used to select which signal will be output, based on a control signal from sequence circuit 44.

In the present embodiments of the present invention, a characteristic value (such as the peak value, average value or maximum contrast value) of the subject image signals is extracted from both parts of a pair of light receiving elements (for example, from both first light receiving parts 81 and 81 and from both second light receiving parts 82 and 83); however, it would also be possible to extract characteristic values from only one side of the pair of light receiving parts (for example, one or the other of first light receiving parts 80 and 81).

Also, the output of the particular characteristic value detection device and the output of the subject image signals are transmitted along the same output line 87; however, the subject image signals and the characteristic value can be separately transmitted, for example, in parallel.

Moreover, a present embodiment of the present invention includes a characteristic value detection device formed on a single chip together with image sensor 8; however, image sensor 8 could easily reside on a separate chip.

Also, the present embodiments of the present invention illustrate a focus detection system in which the focus is detected by light fluxes which pass through the photographic optical system; however, the present embodiment of the present invention can also be applied to a passive type distance measurement system of the so-called "triangulation" method. Such a distance measurement system is disclosed in U.S. Pat. No. 4,469,939 to Utagawa, in which first and second imaging lens form images of the same object. A first photoelectric device has a light-receiving surface and receives the first image by the first imaging lens and a second photoelectric device has a light-receiving surface and receives the second image by the second imaging lens. The relative positions of the light-receiving surfaces of the first and second photoelectric devices is varied and the distance to the object is detected from the fact that the two relative positions have assumed a predetermined relation.

For example, the present invention can be incorporated into a distance measurement system as described above and disclosed in U.S. Pat. No. 4,469,939 wherein two lenses are used for the purpose of forming a subject image. The two lenses can be positioned on a baseline as a distance detection optical system. The two lenses are spaced at defined intervals. A pair of electric discharge accumulation type light receiving parts may also be set up near the image forming plane behind the lenses. Two subject images are formed by the two lenses and the subject image signals corresponding to the intensity distribution of the subject images are output. The subject image signals are then converted by an AD converter and the relative interval of the pair of subject images is computed from the converted data. With the relative intervals, the distance between the lens and the light receiving parts and the distance up to the subject from the baseline are computed. By providing a characteristic value detection device in which the characteristic values of the subject image signals are detected, stored, and output as characteristic signals, the electric charge accumulation time of the light receiving parts may be controlled based on the values obtained by the analog-to-digital converted characteristic signals.

The image sensor according to the preferred embodiment of the present invention has multiple pixels and comprises a light receiving part that produces electric charges corresponding to the light quanta incident on each pixel and a characteristic value detection device. The image sensor accumulates, for each pixel, the electric charge generated at each pixel and outputs the electric charges from the image sensor to an external device, the output from the image sensor being in analog form. A characteristic value detection device detects the characteristic values based on the analog output and provides characteristic signals representing the detected characteristic values.

Because a characteristic value detection device is provided within the image sensor, the present embodiments of the present invention can control accumulation of the image sensor based on the characteristic signals from the characteristic value detection device.

According to the present embodiments of the present invention, a charge coupled type image sensor is part of an image sensor which submits all pixel signals to analog-to-digital conversion unit. Accumulation control of the image sensor is based on the characteristic value from the characteristic value detection device. Therefore, pixel signals are not required to continuously undergo analog-to-digital conversion and the processing time can be used for other processing tasks, thereby resulting in improved system responsiveness.

By contrast, in conventional prior art systems, a unit which determines the characteristic value is not a part of the image sensor. As a result, such conventional systems require the pixel signals to continuously undergo analog-to-digital conversion in order to determine the characteristic value.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A focus detection device which detects a focus condition of a main optical system, comprising:

a charge coupled type light receiving unit which includes a light receiving element that accumulates electric charges over an electric charge accumulation time, the light receiving unit outputting a charge signal having a characteristic value and corresponding to the accumulated electric charges;

a characteristic value detection unit which receives the charge signal from the light receiving unit, detects the characteristic value of the charge signal and outputs a characteristic signal corresponding to the characteristic value;

a computational unit which alternately receives the charge signal and the characteristic signal for computing the focus condition of the main optical system based on the charge signal and the characteristic signal without continuously receiving the charge signal; and an accumulation control unit which controls the electric charge accumulation time of the light receiving element based on the characteristic signal.

2. A focus detection device as in claim 1, further comprising a semiconductor substrate, wherein the characteristic value detection unit and the light receiving unit are both provided on the semiconductor substrate as a single chip.

3. A focus detection device as in claim 1, further comprising a microprocessor, wherein the microprocessor includes the computational unit and the accumulation control unit.

4. A focus detection device as in claim 1, wherein the characteristic value detection unit detects a peak value of the charge signal and outputs, as the characteristic signal, a peak signal corresponding to the detected peak value.

5. A focus detection device as in claim 1, wherein the characteristic value detection unit detects an average value of the charge signal and outputs, as the characteristic signal, an average value signal corresponding to the detected average value.

6. A focus detection device as in claim 1, wherein the characteristic value detection unit detects a contrast value of the charge signal and outputs, as the characteristic signal, a contrast value signal corresponding to the detected contrast value.

7. A focus detection device for use with a main optical system, the focus detection device detecting a focus condition corresponding to a respective focus detection region of multiple focus detection regions, the focus detection device comprising:

a charge coupled type light receiving unit which includes a light receiving element that accumulate electric charges over an electric charge accumulation time, the light receiving element corresponding to one of the multiple focus detection regions and outputting a charge signal having a characteristic value and corresponding to the accumulated electric charges;

a characteristic value detection unit which receives the corresponding charge signal from the light receiving unit, detects the characteristic value of the corresponding charge signal and outputs a characteristic signal corresponding to the characteristic value;

a computational unit which alternately receives the charge signal and the characteristic signal for computing a corresponding focus condition of the main optical system based on the charge signal and the characteristic signal without continuously receiving the charge signal; and an accumulation control unit which controls the electric charge accumulation time of the light receiving element based on the characteristic signal.

8. A focus detection device as in claim 7, further comprising a semiconductor substrate, wherein the characteristic value detection unit and the light receiving unit are both provided on the semiconductor substrate as a single chip.

9. A focus detection device as in claim 7, wherein:

the light receiving unit includes at least two light receiving elements which each accumulate electric charges and the light receiving unit outputs a corresponding charge signal for each light receiving element; and the characteristic value detection unit receives the corresponding charge signal for each light receiving element, detects a respective characteristic value for each corresponding charge signal and outputs a respective characteristic signal corresponding to each characteristic value.

10. A focus detection device as in claim 7, further comprising a microprocessor, wherein the microprocessor includes the computational unit and the accumulation control unit.

11. A focus detection device as in claim 7, wherein the characteristic value detection unit detects a peak value of the charge signal and outputs, as the characteristic signal, a peak signal corresponding to the detected peak value.

12. A focus detection device as in claim 7, wherein the characteristic value detection unit detects an average value of the charge signal and outputs, as the characteristic signal, an average value signal corresponding to the detected average value.

13. A focus detection device as in claim 7, wherein the characteristic value detection unit detects a contrast value of the charge signal and outputs, as the characteristic signal, a contrast value signal corresponding to the detected contrast value.

14. A focus detection device as in claim 7, further comprising a selection unit which selects at least one of the multiple focus detection regions for focus detection, wherein:

the light receiving unit includes at least two light receiving elements which each individually correspond to a respective focus detection region and accumulate electric charges corresponding to the respective focus detection region, the light receiving unit outputting a respectively corresponding charge signal for each light receiving element, each change signal having a corresponding characteristic value, the characteristic value detection unit receives the respectfully corresponding charge signal for each light receiving element, detects the characteristic value corresponding to each charge signal and outputs characteristic signals respectfully corresponding to each characteristic value, the computational unit computes a focus condition for each selected focus detection region, the computation based on the respectively corresponding charge signals, and the accumulation control unit controls the electric charge accumulation time of the light receiving elements corresponding to the focus detection regions not selected by the selection unit, based on the respectfully corresponding characteristic signals.

15. A focus detection device as in claim 14, wherein the accumulation control unit controls the electric charge accumulation time of each respective light receiving element corresponding to a selected focus detection region, based on the charge signal corresponding to the respective light receiving element.

16. A focus detection device for use with a main optical system, the focus detection device detecting a focus condition corresponding to a respective focus detection region of multiple focus detection regions, the focus detection device comprising:

a charge coupled type light receiving unit which includes a light receiving element that accumulate electric charges over an electric charge accumulation time, the light receiving element corresponding to one of the multiple focus detection regions and outputting an analog charge signal having a characteristic value and corresponding to the accumulated electric charges;

a characteristic value detection unit which receives the corresponding analog charge signal from the light receiving unit, detects the characteristic value of the corresponding analog charge signal and outputs an analog characteristic signal corresponding to the characteristic value;

an analog-to-digital conversion unit which receives the analog charge signal and the analog characteristic signal and converts the analog charge signal into corresponding digital charge signal and the analog characteristic signal into a corresponding digital characteristic signal;

a computational unit which receives the digital charge signal and the digital characteristic signal and computes a corresponding focus condition of the main optical system based on the digital charge signal and the digital characteristic signal;

an accumulation control unit which controls the electric charge accumulation time of the light receiving element based on the digital characteristic signal; and a selection unit which selects at least one of the multiple focus detection regions for focus detection, wherein the light receiving unit includes at least two light receiving elements which each individually correspond to a respective focus detection region and accumulate electric charges corresponding to the respective focus detection region, the light receiving unit outputting a respectively corresponding analog charge signal for each light receiving element, each analog change signal having a corresponding characteristic value, the characteristic value detection unit receives the respectfully corresponding analog charge signal for each light receiving element, detects the characteristic value corresponding to each analog charge signal and outputs analog characteristic signals respectfully corresponding to each characteristic value, the analog-to-digital conversion unit conducts analog-to-digital conversion of analog charge signals corresponding to each light receiving element that corresponds to a selected focus detection region and outputs a respectively corresponding digital charge signal for each analog charge signal for which analog-to-digital conversion was conducted, and the analog-to-digital conversion unit does not conduct analog-to-digital conversion of analog charge signals corresponding to light receiving elements that do not correspond to a selected focus detection area, the analog-to-digital conversion unit conducts analog-to-digital conversion of analog characteristic signals respectively corresponding to each light receiving element and outputs a respectively corresponding digital characteristic signal, the computational unit computes a focus condition for each selected focus detection region, the computation based on the respectively corresponding digital charge signals output from the analog-to-digital conversion unit, and the accumulation control unit controls the electric charge accumulation time of the light receiving elements corresponding to the focus detection regions not selected by the selection unit, based on the respectfully corresponding digital characteristic signals.

17. A focus detection device as in claim 16, wherein the accumulation control unit controls the electric charge accumulation time of each respective light receiving element corresponding to a selected focus detection region, based on the digital charge signal corresponding to the respective light receiving element.

* * * * *